(12) United States Patent
Krishnamurthy et al.

(10) Patent No.: US 9,654,985 B2
(45) Date of Patent: May 16, 2017

(54) RADIO LINK SYNCHRONIZATION IN A WIRELESS COMMUNICATION DEVICE

(71) Applicant: GOOGLE TECHNOLOGY HOLDINGS LLC, Mountain View, CA (US)

(72) Inventors: Sandeep H. Krishnamurthy, Mountain View, CA (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 822 days.

(21) Appl. No.: 13/890,290

(22) Filed: May 9, 2013

(65) Prior Publication Data

US 2013/0242975 A1    Sep. 19, 2013

Related U.S. Application Data

(62) Division of application No. 12/605,443, filed on Oct. 26, 2009, now Pat. No. 8,457,112.
(Continued)

(51) Int. Cl.
*H04B 7/212* (2006.01)
*H04W 24/00* (2009.01)
(Continued)

(52) U.S. Cl.
CPC ........... *H04W 24/00* (2013.01); *H04L 1/0026* (2013.01); *H04L 1/20* (2013.01); *H04L 1/0072* (2013.01); *H04W 56/00* (2013.01)

(58) Field of Classification Search
CPC ... H04M 3/00; H04W 56/00; H04W 56/0045; H04W 56/001; H04B 7/2662;
(Continued)

(56) References Cited

U.S. PATENT DOCUMENTS 4,543,657 A * 9/1985 Wilkinson ............. G04G 7/023
368/47
5,815,538 A   9/1998 Grell et al.
(Continued)

FOREIGN PATENT DOCUMENTS

CN   101189823 A   5/2008
EP   1768332 A2   3/2007
(Continued)

OTHER PUBLICATIONS

3GPP TSG-RAN WG4 Meeting #48bis; Edinburgh, Scotland, UK, Sep. 29-Oct. 3, 2008; Radio Link Monitoring Requirements; R4-082657; 3 pages.
(Continued)

*Primary Examiner* — Brenda H Pham
(74) *Attorney, Agent, or Firm* — Faegre Baker Daniels LLP

(57) ABSTRACT

A wireless communication terminal including a controller coupled to a transceiver wherein the controller is configured to determine a synchronization based on a mapping of channel state information to decoder error rate corresponding to a hypothetical control code word, to attempt to decode a control codeword in a received signal, and to conclude that an out of synchronization event has not occurred if the control codeword is decoded successfully regardless of an indication of the mapping.

16 Claims, 6 Drawing Sheets

Related U.S. Application Data

(60) Provisional application No. 61/112,482, filed on Nov. 7, 2008.

(51) Int. Cl.
  *H04L 1/00* (2006.01)
  *H04L 1/20* (2006.01)
  *H04W 56/00* (2009.01)

(58) Field of Classification Search
  CPC ............. H04J 2011/0096; H04J 3/0638; H04J 3/0685; H04J 3/0632; H04J 3/065; H04J 3/0655; H04J 3/0661
  USPC ....... 370/304, 350, 503, 509, 510, 512, 513, 370/514
  See application file for complete search history.

(56) References Cited

U.S. PATENT DOCUMENTS

| | | | |
|---|---|---|---|
| 6,580,748 | B1 | 6/2003 | Muraoka |
| 6,625,467 | B2 | 9/2003 | New et al. |
| 6,782,066 | B1 | 8/2004 | Nicholas et al. |
| 8,300,757 | B2 | 10/2012 | Krishnamurthy et al. |
| 8,976,774 | B2* | 3/2015 | Krishnamurthy ..... H04W 24/02 370/342 |
| 2005/0120282 | A1 | 6/2005 | Kim |
| 2008/0008212 | A1 | 1/2008 | Wang et al. |
| 2008/0019279 | A1 | 1/2008 | Kim et al. |
| 2008/0186893 | A1 | 8/2008 | Kolding et al. |
| 2008/0233963 | A1 | 9/2008 | Alanara et al. |
| 2009/0011714 | A1 | 1/2009 | Hozumi |
| 2009/0296864 | A1 | 12/2009 | Lindoff et al. |
| 2010/0027456 | A1 | 2/2010 | Onggosanusi et al. |
| 2010/0034092 | A1 | 2/2010 | Krishnamurthy et al. |
| 2010/0113008 | A1 | 5/2010 | Wang et al. |
| 2010/0113028 | A1 | 5/2010 | Simonsson et al. |
| 2010/0122121 | A1 | 5/2010 | Krishnamurthy et al. |
| 2010/0240374 | A1* | 9/2010 | Lindoff ............... H04W 76/028 455/437 |
| 2010/0265862 | A1 | 10/2010 | Choi et al. |
| 2011/0110251 | A1 | 5/2011 | Krishnamurthy et al. |
| 2011/0249780 | A1* | 10/2011 | Mollfulleda San Julian ............. H04L 27/2613 375/354 |
| 2012/0044982 | A1 | 2/2012 | Sampath et al. |
| 2012/0108177 | A1 | 5/2012 | Miao et al. |
| 2012/0327984 | A1 | 12/2012 | Krishnamurthy et al. |
| 2013/0215783 | A1 | 8/2013 | Krishnamurthy et al. |
| 2013/0315358 | A1 | 11/2013 | Krishnamurthy et al. |

FOREIGN PATENT DOCUMENTS

| | | |
|---|---|---|
| EP | 1947812 A1 | 7/2008 |
| JP | 2006121159 A | 5/2006 |
| JP | 2008092383 A | 4/2008 |
| WO | 9823118 A1 | 5/1998 |
| WO | 0101610 A1 | 1/2001 |
| WO | 2007130324 A2 | 11/2007 |
| WO | 2008073144 A1 | 6/2008 |
| WO | 2010062503 A2 | 6/2010 |

OTHER PUBLICATIONS

EESM for IEEE 802.16e: WiMaX; Seventh IEEE/ACIS International Conference on Computer Information Science; Mumatz et al., 6 pages.

3GPP TSG RAN WG4 Meeting #48bis; Edinburgh, Scotland, UK, Sep. 29-Oct. 3, 2008; Response LS on Indicating Radio Problem Detection; R4-082655; 2 pages.

Jensen, Tobias Lindstrom et al.: "Mutual Information Metrics for Fast Link Adaptation in IEEE 082.11n", IEEE Communications Society, ICC 2008 Proceedings, 6 pages.

3GPP TSG-RAN WG4 Meeting #49; "Radio Link Monitoring"; Prague, Czech Republic, Nov. 10-14, 2008; R4-083333; 5 pages.

3GPP TSG-RAN WG4 Meeting #48; "Details on Radio Link Failure and Recovery in LTE"; Jeju, South Korea; Aug. 18-22, 2008; R4-081998; 8 pages.

Nortel Networks: "Radio Link Problem Detection by the UE", 3GPP Draft; R4-081726, 3rd Generation Partnership Project (3GPP), Mobile Competence Centre; 650, Route Des Lucioles; F-06921 Sophia-Antipolis Cedex; France, vol. RAN WG4, No. Jeju; Aug. 12, 2008, Aug. 12, 2008, all pages.

Ericsson: "E-Utra Out-of-Sync and In-Sync Requirements in DRX", 3G;; Draft; R4-082480_Out_of_Sync_Detection_DRX, 3rd Generation Partnerhip Project (3GPP), Mobile Competence Centre; 650, Route Des Lucioles; F-06921 Sophia-Antipolis Cedex; France, No. Scotland; Sep. 26, 2008, Sep. 26, 2008, all pages.

Nokia: "Radio link problem detection", Sep. 28, 2008, 3GPP Draft; R4-082439, 3rd Generation Partnership Project (3GPP), Mobile Competence Centre; 650, Routedes Lucioles; F-06921 Sophia-Antipolis Cedex; France, all pages.

3GPP TSG-RAN WG4 Meeting #47bis; "Out of Synchronization Detection in E-Utran"; Munich, Germany, Jun. 16-20, 2008; R4-081399; 6 pages.

3GPP TSG-RAN WG1 Meeting #53; "LS on Indicating Radio Problem Detection"; Kansas City, USA, May 4-9, 2008; R1-082252; 1 page.

Robert Love et al.: "PHY 32-1—Downlink Control Channel Design for 3GPP LTE", Mar. 31, 2008, Wireless Communications and Networking Conference, 2008, WCNC 2008, IEEE, IEEE, Piscataway, NJ, USA, pp. 813-818.

Motorola: "EESM Link Error Prediction for EUTRA System Evaluation", Aug. 25, 2005, 3GPP Draft; R1-050718_LTE_EESM, 3rd Generation Partnership Project(3GPP), Mobile Competence Centre; 650, Route Des Lucioles; F-06921 Sophia-Antipolis Cedex; France, all pages.

3GPP TSG RAN WG4 #48, R4-082189 "Simulation Assumptions for Out-of-Sync and In-Sync Detection in LTE" Motorola; Jeju, SouthKorea; Aug. 18-22, 2008, 3 pages.

3GPP TSG RAN WG4 #49, R4-083038 "Radio Link Problem Detection in LTE" NTT DoCoMo; Prague, Czech Republic; Nov. 10-14, 2008, 4 pages.

The State Intellectual Property Office of the People's Republic of China, "Notification of the First Office Action" for Chinese Patent Application No. 200980144460.9 dated Jul. 1, 2013, 8 pages.

European Patent Office, International Search Report and Written Opinion for PCT Application No. PCT/US2009/062412 (related to above-captioned patent application), mailed May 28, 2010.

R.O.C. Taiwan Patent Office, Office Action for Taiwanese Patent Application No. 103129405 (related to above-captioned patent application), mailed Sep. 15, 2015.

State Intellectual Property Office of the People's Republic of China, Notification of the First Office Action for Chinese Patent Application No. 201310424902.3 (related to above-captioned patent application), mailed Dec. 3, 2015.

State Intellectual Property Office of the People's Republic of China, Notification of the Second Office Action for Chinese Patent Application No. 201310424902.3 (related to above-captioned patent application), mailed May 30, 2016.

* cited by examiner

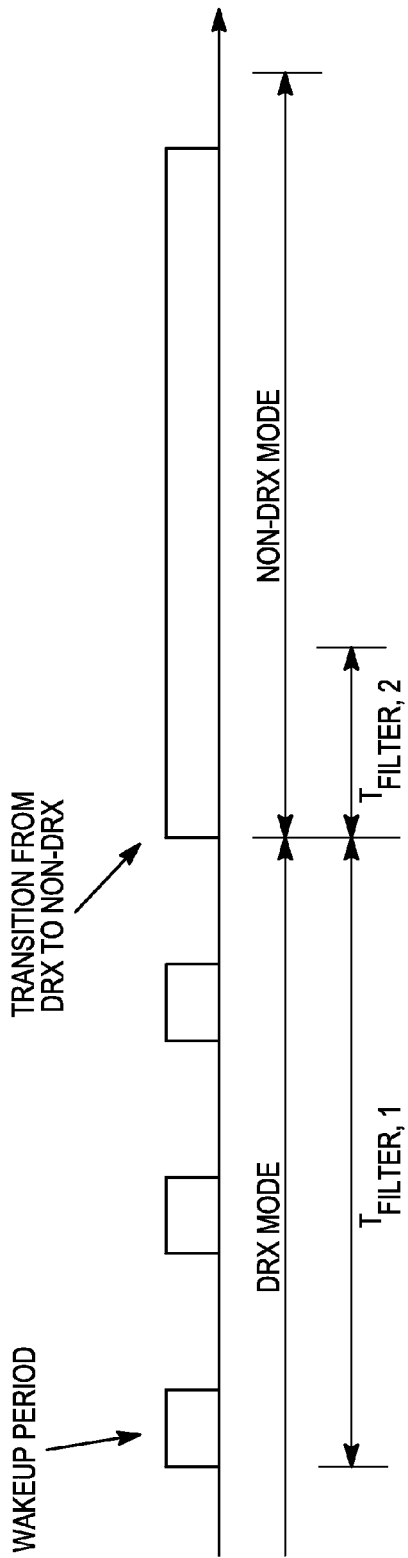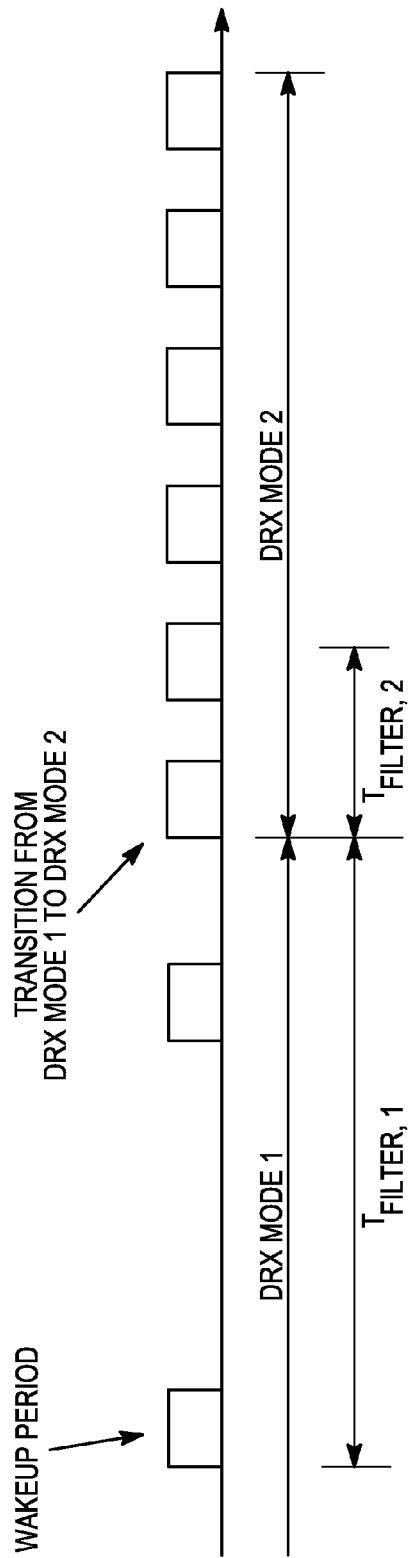

RADIO LINK SYNCHRONIZATION IN A WIRELESS COMMUNICATION DEVICE

CROSS REFERENCE TO RELATED APPLICATIONS

The present application is related to U.S. application No. 61/112,482 filed on 7 Nov. 2008, the contents of which are hereby incorporated by reference and from which benefits are claimed under 35 U.S.C. 119.

FIELD OF THE DISCLOSURE

The present invention relates to wireless communications and more particularly to determining synchronization of a radio link in a wireless communication terminal.

BACKGROUND

The Third Generation Partnership Project (3GPP) is developing a Long Term Evolution (LTE) carrier using a physical layer based on globally applicable evolved universal terrestrial radio access (E-UTRA). A mobile terminal or station (MS), also referred to as User equipment (UE), may use a cell-specific reference signal as a metric to determine if a radio link with the base station is in synchronization or out of synchronization by determining whether reliable transmission of a physical downlink control channel (PDCCH) code word with specific formats can be supported over the link.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

FIG. 7 illustrates a receiver transitioning from DRX mode to non-DRX mode.

FIG. 8 illustrates a receiver transitioning from a first DRX mode to a second DRX mode.

DETAILED DESCRIPTION

A method, telecommunication apparatus, and electronic device for detecting a status of a radio link are disclosed. A transceiver may maintain a radio link with a network base station. A processor may map channel state information to a synchronization status associated with the radio link based on the received signal and determine the synchronization status via a block error rate estimate in the radio link based on the channel state information.

Figure 1:
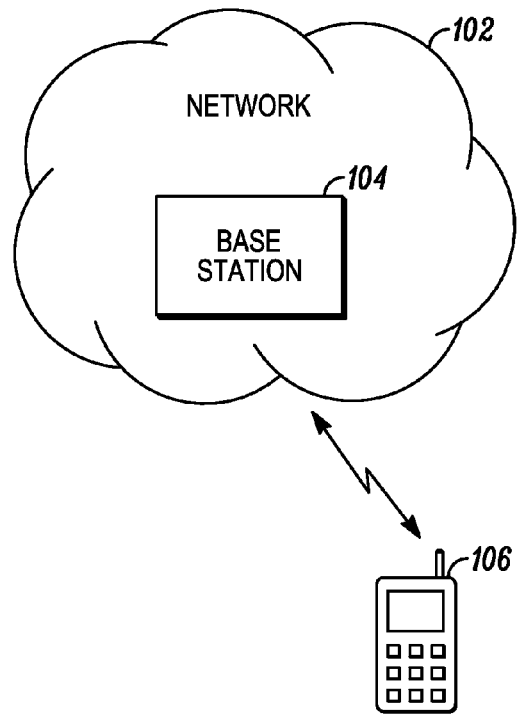
FIG. 1 illustrates a communication system.

FIG. 1 illustrates a communication system 100 including a network 102, base station 104 and user equipment (UE) 106. Various communication devices may exchange data or information through the network 102. The network 102 may be an evolved universal terrestrial radio access (E-UTRA) or other type of telecommunication network. A network entity, such as the base station 104, may assign a UE identifier (UEID) to the UE 106 when the UE 106 first joins the network 102. For one embodiment, the base station 104 may be a distributed set of servers in the network. The UE 106 may be one of several types of handheld or mobile devices, such as, a mobile phone, a laptop, or a personal digital assistant (PDA). In one embodiment, the UE 106 may be a WiFi® capable device, a WiMax® capable device, or other wireless devices.

Figure 2:
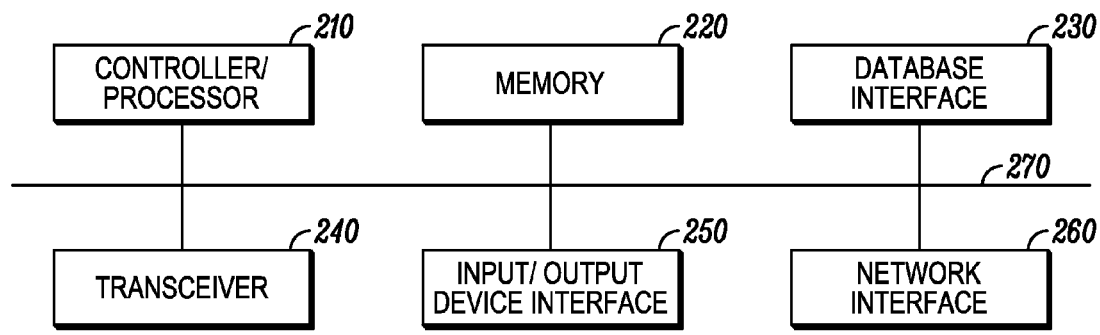
FIG. 2 illustrates a possible configuration of a computing system to act as a base station.

FIG. 2 illustrates a possible configuration of a computing system to act as a base station 104. The base station 104 may include a controller/processor 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

In FIG. 2, the controller/processor 210 may be any programmable processor. The subject of the disclosure may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

In FIG. 2, the memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. In FIG. 2, the database interface 230 may be used by the controller/processor 210 to access the database. The database may contain any formatting data to connect the UE 106 to the network 102. The transceiver 240 may create a data connection with the UE. The transceiver may create a physical downlink control channel (PDCCH) and a physical uplink control channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station 104 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
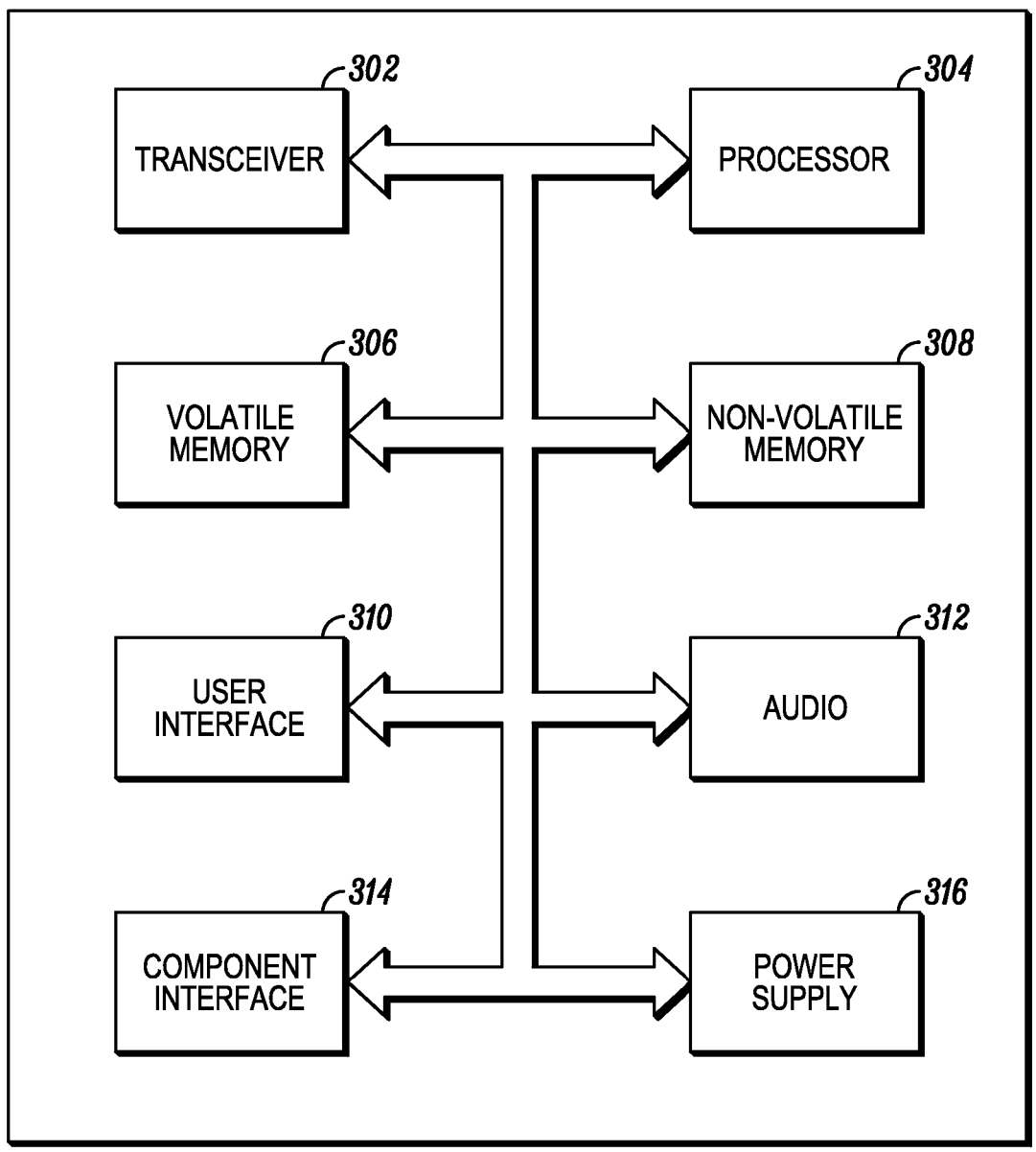
FIG. 3 illustrates in a UE block diagram.

FIG. 3 illustrates in a block diagram one embodiment of a telecommunication apparatus or electronic device to act as the UE 106. The UE 106 may be capable of accessing the information or data stored in the network 102. For some embodiments of the disclosure, the UE 106 may also support one or more applications for performing various communications with the network 102. The UE 106 may be a handheld device, such as, a mobile phone, a laptop, or a personal digital assistant (PDA). For some embodiments, the UE 106 may be WiFi® capable device, which may be used to access the network 102 for data or by voice using VOIP.

The UE 106 may include a transceiver 302, which is capable of sending and receiving data over the network 102. The UE 106 may include a processor 304 that executes stored programs. The UE 106 may also include a volatile memory 306 and a non-volatile memory 308 which are used by the processor 304. The UE 106 may include a user input interface 310 that may comprise elements such as a keypad, display, touch screen, and the like. The UE 106 may also include a user output device that may comprise a display screen and an audio interface 312 that may comprise elements such as a microphone, earphone, and speaker. The UE 106 also may include a component interface 314 to which additional elements may be attached, for example, a universal serial bus (USB) interface. Finally, the UE 106 may include a power supply 316.

A UE 106 may determine whether a radio link is in synchronization or out of synchronization with a base station by assuming the transmission of a control channel type with a specific format, subcarrier mapping, transmit antenna configuration, and power boost. The transmission format may correspond to a particular error correcting code type (e.g., a convolutional code, block code, turbo-code), payload size, code rate, block size, modulation type, or other error correcting code type. The control channel type need not be physically transmitted in the signal, and no actual decoding followed by cyclical redundancy check (CRC) may be necessary to detect whether the radio link is out-of-synchronization/in-synchronization. The UE 106 may make the detection by using an estimate of the channel state for a portion of the sub-frame which contains the control channel, such as propagation channel coefficients, interference variance, among other channel information. The channel state information may be estimated from cell-specific reference signals or by other methods. The channel state may be defined in generic terms as the realization of the propagation channel between the transmitter and the receiver together with noise and interfering signals over the time-frequency region of signal reception. As one example, channel state may refer to the collection of the per-subcarrier channel coefficients and the per-subcarrier interference plus noise variance statistics. As another example, channel state information may refer to the per-subcarrier signal to interference and noise ratio (SINR).

The UE 106 may estimate the block error rate (BLER) of a radio link to determine if the link is usable, in failure, or in recovery. The SINR of the reference signal computed over the entire time-frequency resources in the control region may be used as an input to a channel state function describing channel state information. The channel state information function may map the sub-band signal-to-noise ratio (SNR) and channel quality information (CQI) type metrics. In one particular implementation, the sub-carrier level SNR is mapped to block error rate (BLER). The channel state information function may approximate reference signal SINR computed over those resource element groups corresponding to the physical downlink control channel (PDCCH) codeword. The channel state information function may be a cascaded set of functions. In one embodiment, a first sub-function may take the received signal as an input to calculate an estimate of the channel state, such as a channel coefficient estimated per subcarrier and the interference and noise variance per sub-carrier. A second sub-function may take the channel state estimate and map that to the BLER estimate.

Different UE receiver implementations may have different PDCCH demodulator or decoder capabilities. The BLER mappings for a UE 106 may be adjusted to more accurately reflect the actual implementation. Alternately, a UE 106 may use pre-specified functions to obtain an "effective SINR" metric and for comparison against thresholds to identify an out-of-synchronization or in-synchronization event. Alternatively, a UE 106 may form mean mutual information per bit (MMIB) estimates or channel capacity estimates instead of BLER to determine whether the link can support reliable transmissions of PDCCH.

Typically, a radio link monitoring mechanism (implemented in software or hardware or a combination of the two) includes determining whether an out-of-synchronization event or an in-synchronization event has occurred by processing the received signal over an evaluation window. The detected out-of-synchronization or in-synchronization events can be further processed. For example, indications corresponding to either event (out-of-synchronization or in-synchronization) can be filtered over a period of time to declare a link failure event or a link recovery event.

Suppose for example, that the transmission includes PDCCH codewords and the receiver attempts to decode them. If the receiver is able to determine whether the control codewords were decoded correctly, then it can make use of this information in addition to the channel state information to determine an out-of-synchronization or an in-synchronization event has occurred. If one control codeword or a plurality of control codewords that were received within an interval of time were decoded correctly, then the receiver may not choose to process the out of synchronization indications. Alternately, if one control codeword or a plurality of control codewords that were received within an interval of time were decoded correctly, the receiver may choose to generate and process an in synchronization indication. On the other hand, if the receiver had the mechanism to determine that one or more of the control codewords intended for the receiver, were decoded incorrectly, it may choose not to generate and process in synchronization indications.

In one embodiment, the controller is configured to determine a synchronization based on a mapping of channel state information to decoder error rate corresponding to a hypothetical control code word. The controller is also configured to attempt to decode a control codeword in a received signal and to conclude that an out of synchronization event has not occurred if the control codeword is decoded successfully regardless of an indication of the mapping. In some implementations, the controller is configured to conclude that an in synchronization event has occurred if the control codeword is decoded successfully regardless of an indication of the mapping. The controller may also be configured to conclude that an in synchronization event has not occurred if at least one control codeword addressed to the UE was decoded unsuccessfully.

The indications generated for out of synchronization events and in synchronization events are respectively processed further. The indications can be filtered for an evaluation period. A receiver can be configured to operate either in discontinuous reception (DRX) mode comprising period on and sleep durations or in non-DRX mode. The DRX and non-DRX modes can have different evaluation time periods for the indications. Further, the evaluation time period for the indications for DRX mode can be dependent on the DRX cycle periodicity. The receiver transitions from one mode to another. In FIG. 7, for example, a receiver operating in DRX mode transitions to non-DRX mode. In FIG. 8, a receiver operating in DRX mode with one periodicity transitions to a DRX mode having another periodicity, which may be greater or less than that of the first DRX mode.

Suppose that the receiver mode of operation prior to the transition has a first filter with a first period of evaluation for the indications. And the second receiver mode of operation after the transition has a second filter with a second period of evaluation for the indications. There are two options that the receiver has for continuing the evaluations immediately after the transition. In one embodiment, the receiver uses a first filter with a first period of evaluation from the start of the transition up until a time equal to the second period of evaluation corresponding to the second filter has elapsed. Subsequent to that, it can start using the second filter with the second period of evaluation. More particularly, the controller coupled to the transceiver, is configured to estimate block error rate for a hypothetical control codeword. The controller is also configured to determine radio link synchronization when the UE is in a first mode of operation using a first filter output based on the estimated block error rate and to determine radio link synchronization when the UE is in a second mode of operation using a second filter output based on the estimated block error rate. Upon transitioning from the first mode of operation to the second mode of operation, the controller is configured to initially use the first filter output for determining radio link synchronization and then to use the second filter output for determining radio link synchronization while operating in the second mode of operation.

In one embodiment, the first mode of operation is discontinuous reception mode and the second mode of operation is non-discontinuous reception mode. In one implementation of this embodiment, the controller is configured to use the first filter output for determining radio link synchronization from the start of the transition to the state of non-discontinuous reception mode until a time equal to a second evaluation interval of the second filter has elapsed. In other implementations, the first filter output may be used for other time periods.

In another embodiment, the first mode of operation is a first discontinuous reception mode and the second mode of operation is a second discontinuous reception mode, a periodicity of the first discontinuous reception mode is different than a periodicity of the second discontinuous reception mode. In one implementation of this embodiment, the controller configured to use the first filter output for determining radio link synchronization from the start of the transition to the state of the second discontinuous reception mode until a time equal to a second evaluation interval of the second filter has elapsed. In other implementations, the first filter output may be used for other time periods.

In another embodiment, the receiver can cease to perform evaluation or the indicators generated from the start of the transition up until a time equal to the second period of evaluation corresponding to the second filter has elapsed. Subsequent to that, it can start using the second filter with the second period of evaluation. More particularly, the controller coupled to the transceiver, is configured to a estimate block error rate for a hypothetical control codeword. The controller is also configured to determine radio link synchronization when operating in a first mode of operation using a first filter output based on the estimated block error rate. Upon transitioning from the first mode of operation to a second mode of operation, the controller is configured to not determine radio link synchronization for an initial period and then to determine radio link synchronization when operating in the second mode of operation using a second filter output based on the estimated block error rate.

In one embodiment, the first mode of operation is discontinuous reception mode and the second mode of operation is non-discontinuous reception mode. In one implementation of this embodiment, the controller is configured to not evaluate radio link synchronization from the start of transitioning to the second mode of operation for an initial period corresponding to a time equal to a second evaluation interval of the second filter. In other implementations, other initial time periods may be used.

In another embodiment, the first mode of operation is a first discontinuous reception mode and the second mode of operation is a second discontinuous reception mode, a periodicity of the first discontinuous reception mode is different than a periodicity of the second discontinuous reception mode. In one implementation of this embodiment, the controller is configured to not evaluate radio link synchronization from the start of transitioning to the second mode of operation for an initial period until a time equal to a second evaluation interval of the second filter has elapsed. In other implementations, other initial time periods may be used.

The channel state information or BLER estimate may be obtained from each sub-frame sampled from the processing window in continuous reception mode. For a discontinuous reception mode of operation, these sub-frames may correspond to the sub-frames, or a subset thereof, at the paging occasions successively separated by a discontinuous cycle period. The processing windows may correspond to multiple discontinuous reception period durations from which the sub-frames are sampled.

The UE 106 may use the aggregated per-sub-band channel state information for the PDCCH codeword to obtain the BLER estimate. Since the actual time-frequency diversity experienced by the PDCCH codeword in the propagation channel generates the BLER estimate, the estimate of BLER may be more accurate. On the other hand, if the UE 106 uses a single reference signal SINR level, compared against thresholds, for determination of the synchronization events, the wideband nature of the PDCCH codeword mapping and the associated gains due to frequency diversity for higher bandwidths, such as greater than 1.4 MHz, may not be captured. A synchronization event may be an event in which the synchronization status of the radio link changes. This practice may lead to increased false triggers of out-of-synchronization events when the narrowband reference signal SINR is low, such as when signal over the measurement bandwidth is in fade, while the PDCCH codeword would have been decodable.

Figure 4:
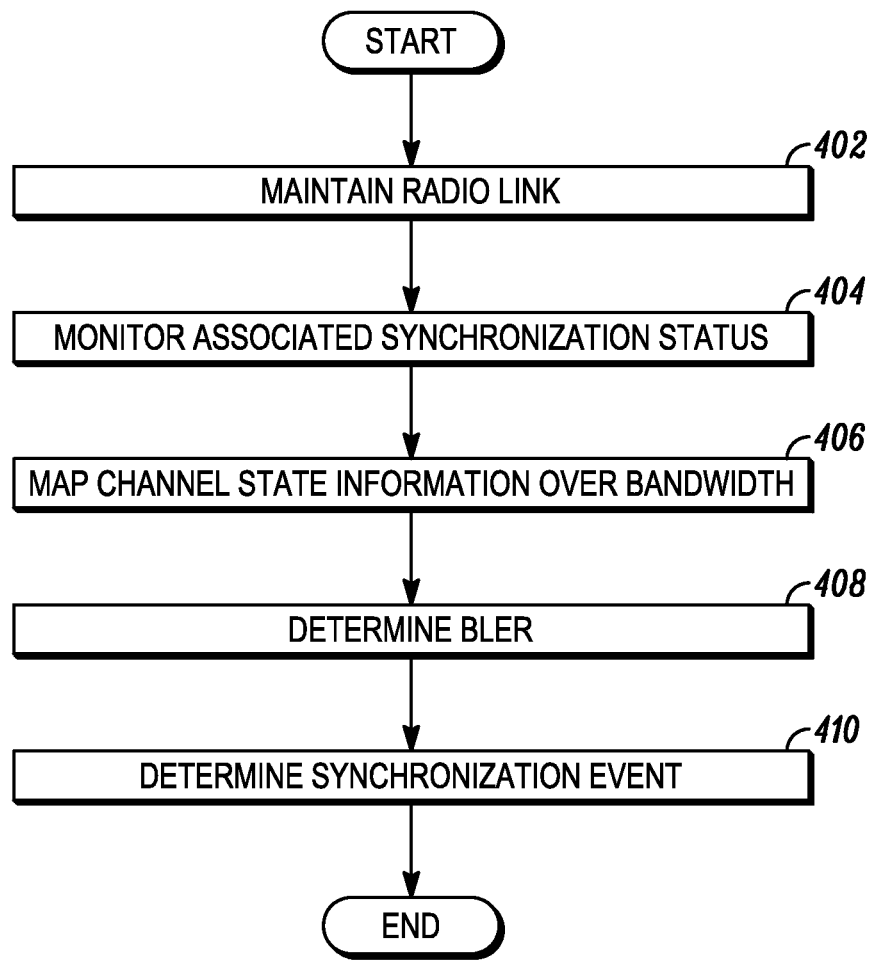
FIG. 4 is a flowchart for determining a synchronization event.

FIG. 4 illustrates a method 400 for determining a synchronization event. At 402, the UE maintains a radio link with a base station. At 404, the UE may monitor the synchronization status associated with the radio link. At 406, the UE maps channel state information to a synchronization status of the radio link based on the received signal over a specified bandwidth. At 408, the UE determines the synchronization status via the BLER estimate in the radio link based on the channel state information. At 410, the UE determines the synchronization event based upon the BLER.

The UE 106 may use different formats to determine when an out-of-synchronization event has occurred versus when an in-synchronization event has occurred. A first threshold, herein referred to as a failure threshold, may signify at which point a BLER becomes high enough to indicate that a radio link has become out of synchronization. A second threshold, herein referred to as a recovery threshold, may signify at which point a BLER becomes low enough to indicate that a radio link has become in synchronization. Both levels may be determined as a function of bandwidth, such as 1.4, 3, 5, 10, 15, 20 MHz, and transmit antenna configuration, such as 1×2, 2×2 space frequency block coding (SFBC) or 4×2 SFBC-frequency switching transmission diversity (FSTD). Alternately, the UE 106 may use just two levels, one for out-of-synchronization and one for in-synchronization, common across bandwidths and transmit antenna configuration.

An out-of-synchronization event may occur when the SNR drops or the channel quality deteriorates such that the control or shared channels become un-decodable. The threshold may be determined by considering the best coverage available when the maximum error protection, maximum power boosting and maximum frequency-time diversity transmission are deployed.

The UE 106 may use reference signal symbols to obtain a per-sub-band channel state information for the control region of a sub-frame. A sub-band may be one control channel element (CCE), resource element group, or some other aggregation of subcarriers that contain the mapped symbols of the PDCCH codeword. A PDCCH payload may have a specific format, such as Format 1A. The format may have a specific minimum payload size, such as 31 bits for 10 MHz; a specific maximum aggregation level applicable to the bandwidth, such as an aggregation level of 8 for 10 MHz bandwidth; and a specific codeword-to-subcarrier mapping that achieves the maximum time-frequency diversity. Alternately, the UE 106 may use a typical payload size, typical aggregation level, and a typical codeword to subcarrier mapping. The UE 106 may use a maximum power boost relative to the reference signal, such as +3 dB, or a typical power boost relative to the reference signal, such as 0 dB.

The base station 104 need not actually transmit the PDCCH payload of the assumed type. The UE 106 may calculate the per-sub-band channel state information for the subcarrier under the assumption that PDCCH payload of the assumed type was transmitted. The UE 106 may use the per-sub-band channel state information for the entire PDCCH codeword for the assumed type to obtain a BLER estimate for the PDCCH codeword. The UE 106 may obtain the BLER estimate for each of the sub-frames in an out-of-synchronization processing interval, such as an interval of 200 ms. The UE 106 may average these estimates over the out-of-synchronization processing duration.

To generalize this mapping, the UE 106 may define channel state information that maps all the per-sub-band SINR or CQI-type metrics from the sub-frames to a single BLER estimate that is compared against a threshold for determination of the out-of-synchronization event. The UE 106 may define a criterion for out-of-synchronization detection as an event in which the average BLER estimate is greater than a set percentage over the out-of-synchronization processing duration or the BLER estimate is greater than a set percentage for the last set number of sub-frames.

In one example, the UE 106 may form BLER estimates for five sub-frames separated by 40 ms in a 200 ms processing window for the purpose of out-of-synchronization evaluation. For a sub-frame for which the PDCCH BLER is being estimated, the UE 106 may assume that a PDCCH Format 1A payload of ~42 bits (for 10 MHz operation) is being transmitted in the control region on the first n (0<n<4) orthogonal frequency division multiplexing (OFDM) symbols in the sub-frame, starting the first CCE in the common search space at an aggregation level of 8. The UE 106 may identify the time-frequency resource element groups on which the codeword gets mapped and calculates the reference signal SINR for those resource element groups. The reference signal SINR may be calculated by signal interpolation, by a minimum mean square error channel and noise estimator, or some other technique. For 72 resource element groups, the UE 106 may use 72 non-negative reference signal SINR terms in BLER estimation. The UE 106 may use the reference signal resources from the same sub-frame for reference signal SINR estimation for the control resource element groups, as well as current, past and future sub-frames. The channel state information that maps all the reference signal-SINR terms to a BLER value may be determined off-line and pre-stored in the UE 106. This function may map the 72 reference signal SINR terms to a BLER estimate value for the Format 1A PDCCH codeword. One example of channel state information may be a function that takes mean reference signal SINR and the covariance of a reference signal SINR, capturing the mean level and the time-frequency variation of the reference signal SINR, as input arguments and outputs a BLER value. The power boost value assumed for the Format 1A PDCCH payload may be subsumed into the channel state information. Alternately, the power boost may be added to the reference signal SINR terms to reflect the SINR corresponding to the resource element groups to which the PDCCH payload is mapped. The BLER estimates from the 5 sub-frames may then be averaged to compute an average BLER which is compared against a threshold, such as 10%, to check if the out-of-synchronization criterion is satisfied.

Out-of-synchronization determination may create a processing overhead relative to the case when the out-of-synchronization event is determined using, for example, the narrowband reference signal SINR measure. To correct for this, the UE 106 may subdivide the out-of-synchronization processing window of into two parts. The UE 106 may continuously monitor the narrowband reference signal received power (RSRP) averaged over the duration of the first part. Since the narrowband reference signal SINR measure somewhat correlates with the wideband CQI-type metric or per-sub-band SINR for the PDCCH resource elements, a synchronization check threshold may be used to trigger BLER estimation. For example, if the narrowband reference signal SINR drops below the synchronization threshold chosen by the implementation by averaging reference signal SINR over the first part of the processing window, the second part may use the synchronization threshold to trigger the search for an out-of-synchronization event using the BLER mapping approach.

Figure 5:
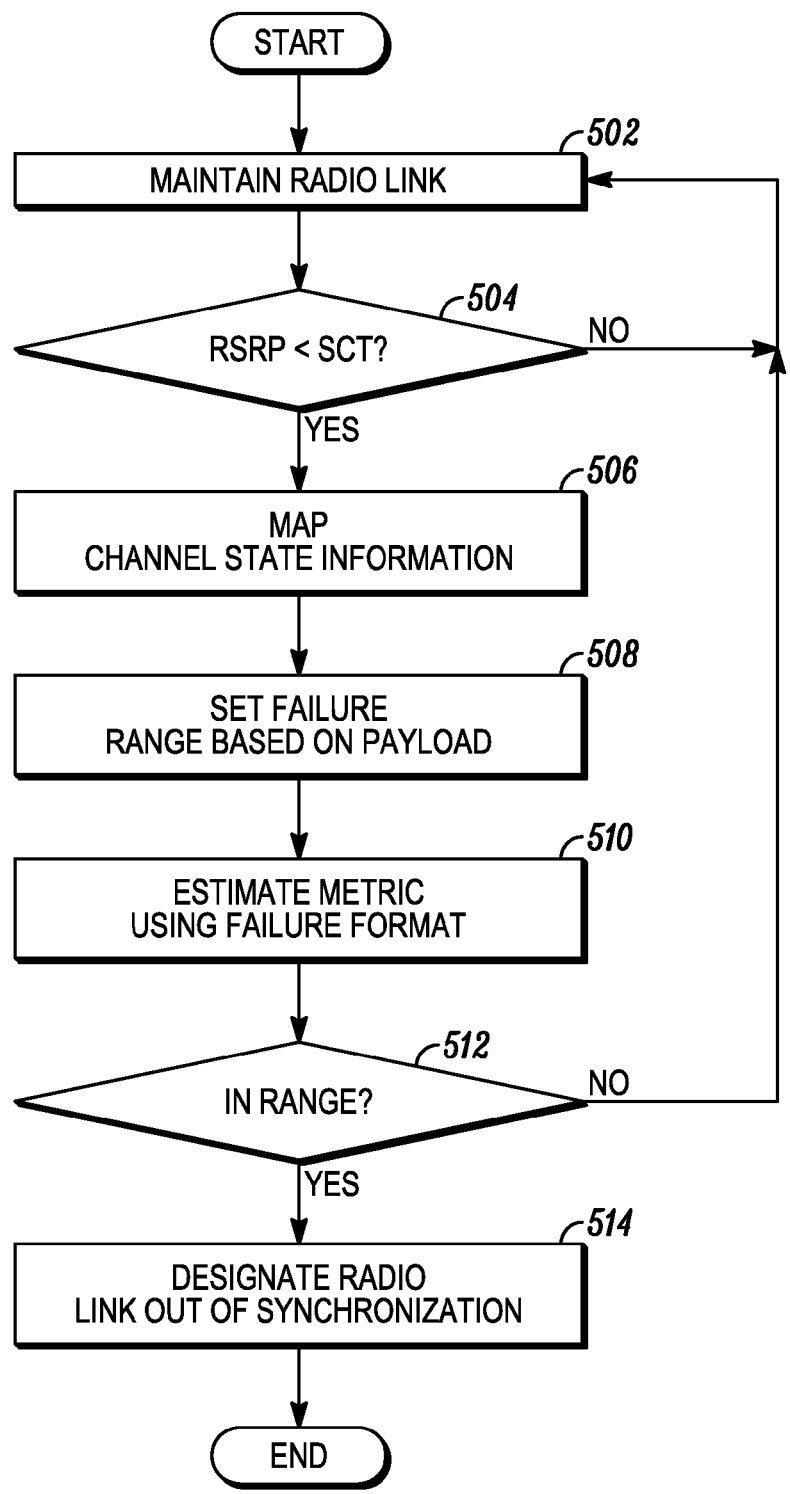
FIG. 5 is a flowchart for determining whether a radio link is out of synchronization.

FIG. 5 illustrates a method 500 for determining whether a radio link is out of synchronization. At 502, the UE maintains a radio link with a base station. At 504, if the RSRP is less than a synchronization check threshold, the UE may map channel state information for the radio link based on the received signal over a specified bandwidth (Block 506). At 508, the UE sets the failure range based upon a payload parameter, such as a control channel type. The control channel type may be a specific transmission format, sub-carrier mapping, transmit antenna configuration, power boost, or other parameters. The transmission format may be an error correcting code type, payload size, code rate, block size, modulation type, or other formats. The error correcting code type may be a convolution code, block code, turbo-code, or other codes. At block 510, the UE estimates a metric for the radio link based on the channel state information using a format best suited for determining if the radio link failure is about to occur, or failure format. The metric may be a block error rate, a mean mutual information per bit, average signal to noise ratio, channel capacity, or other metric. If the metric is within the failure range, at 512, the UE may designate the radio link as having an out of synchronization event (Block 514).

The UE 106 may use a different format for determining an in-synchronization event, with less overhead. The UE 106 may use reference signal symbols to obtain a per-sub-band channel state information for the control region of a sub-frame. A sub-band may be one control channel element (CCE), resource element group, or some other aggregation of subcarriers that contain the mapped symbols of the PDCCH codeword. A PDCCH payload may have a specific format, such as Format 1A or 1C. The format may have a specific maximum payload size, such as 31 bits for 10 MHz; a specific minimum aggregation level applicable to the bandwidth, such as an aggregation level of 2; and a specific codeword-to-subcarrier mapping that achieves the minimum time-frequency diversity. Alternately, the UE 106 may use a typical payload size, typical aggregation level, and a typical codeword to subcarrier mapping. The UE 106 may use a minimum power boost relative to the reference signal, such as −6 dB, or a typical power boost relative to the reference signal, such as 0 dB.

The base station 104 need not actually transmit the PDCCH payload of the assumed type. The UE 106 may calculate the per-sub-band channel state information for the subcarrier under the assumption that PDCCH payload of the assumed type was transmitted. The UE 106 may use the per-sub-band channel state information for the entire PDCCH codeword for the assumed type to obtain a BLER estimate for the PDCCH codeword. The UE 106 may obtain the BLER estimate for each of the sub-frames in an in-synchronization processing interval, such as an interval of 100 ms. The UE 106 may average these estimates over the in-synchronization processing duration.

To generalize this mapping, the UE 106 may define channel state information that maps all the per-sub-band SINR or channel state information-type metrics from the sub-frames to a single BLER estimate that is compared against a threshold for determination of the in-synchronization event. The UE 106 may define a criterion for in-synchronization detection as an event in which the average BLER estimate is less than a set percentage over the in-synchronization processing duration or the BLER estimate is less than a set percentage for the last set number of sub-frames.

For in-synchronization evaluation, the UE 106 may use Format 1C, as the system information block (SIB), paging channel (PCH) and random access channel (RACH) response messages are addressed by this PDCCH format. After the UE 106 goes to in-synchronization state, the UE 106 may attempt cell reselection and send a RACH message on the uplink. The signal conditions may be such that the RACH response and the SIB transmissions are decodable by the UE 106. Further, a Format 1C codeword may have lower error protection, minimum power boost, and subcarrier mapping that achieves minimum frequency-time diversity resulting in the limiting behavior. Alternately, the UE 106 may use any other typical control channel format aimed at characterizing the typical behavior.

In one example, the UE 106 may form BLER estimates for five sub-frames separated by 20 ms in a 100 ms processing window for the purpose of in-synchronization evaluation. For a sub-frame for which the PDCCH BLER is being estimated, the UE 106 may assume that a PDCCH Format 1C payload of ~31 bits (for 10 MHz operation) is being transmitted in the control region on the first three OFDM symbols in the sub-frame, starting the first CCE in the common search space at an aggregation level of 2. The UE 106 may identify the time-frequency resource element groups on which the codeword gets mapped and calculate the reference signal SINR for those resource element groups. The UE 106 may use channel state information to determine the BLER for that sub-frame.

Figure 6:
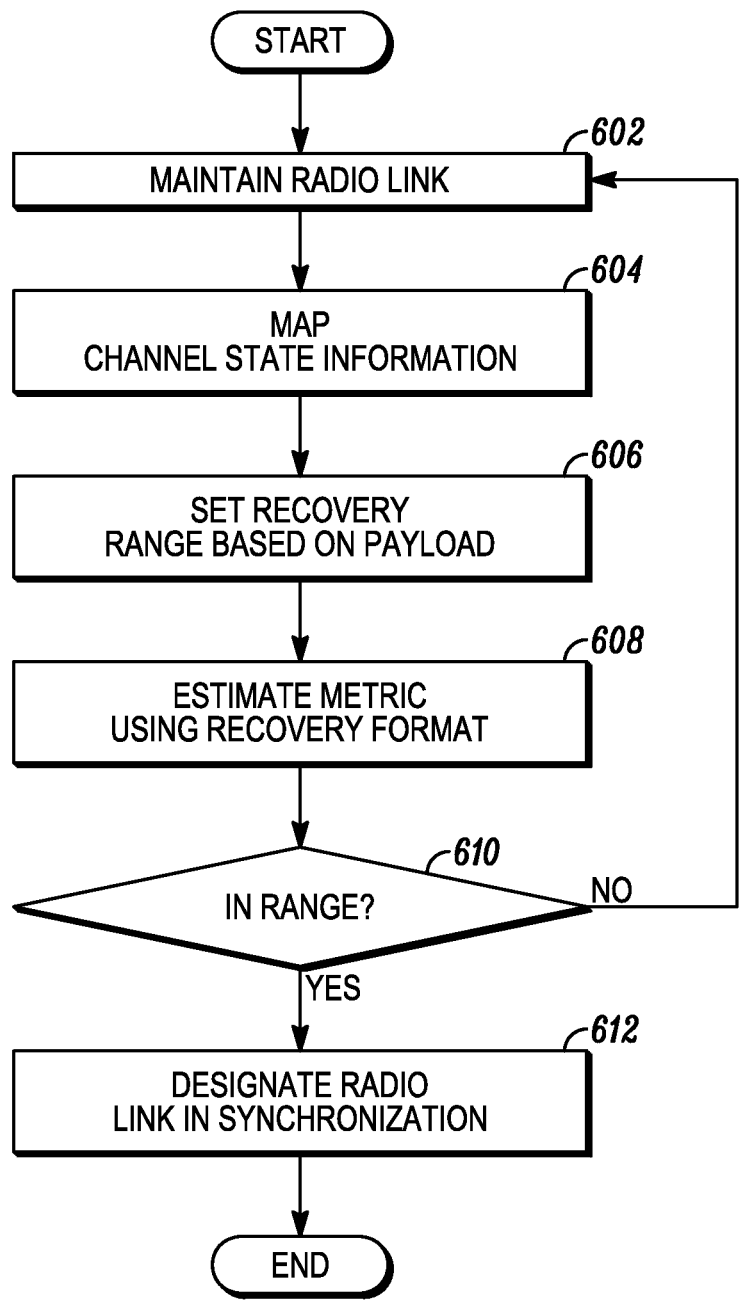
FIG. 6 is a flowchart for determining whether a radio link is in synchronization.

FIG. 6 illustrates a method 600 of determining whether a radio link is in synchronization. At 602, the UE maintains a radio link with a base station. At 604, the UE maps channel state information function for the radio link based on the subcarrier over a specified bandwidth. At 606, the UE sets the recovery range based upon a payload parameter, such as control channel type. The control channel type may be a specific transmission format, sub-carrier mapping, transmit antenna configuration, power boost, or other parameters. The transmission format may be an error correcting code type, payload size, code rate, block size, modulation type, or other formats. The error correcting code type may be a convolution code, block code, turbo-code, or other codes. The UE 106 may estimate the metric for the radio link based on the channel state information using a format best suited for determining if the radio link recovery is about to occur, or recovery format (Block 608). The metric may be a block error rate, mean mutual information per bit, average signal to noise ratio, channel capacity, or other metric. If the metric is within the recovery range at 610, the UE designates the radio link as having an in synchronization event (Block 612).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication terminal comprising:
a transceiver configured to operate in either discontinuous reception (DRX) mode or in non-DRX mode; and
a controller coupled to the transceiver, the controller configured to determine a synchronization based on determining a decoder error rate corresponding to a hypothetical control codeword over an evaluation period that includes at least one of a first evaluation period and a second evaluation period, wherein the transceiver uses the first evaluation period when the transceiver is configured to operate in DRX mode and the second evaluation period when the transceiver is configured to operate in non-DRX mode, wherein the first evaluation period is different than the second evaluation period, the controller configured to attempt to decode a control codeword in a received signal based on the hypothetical control codeword, the controller configured to conclude that an out of synchronization event has not occurred if the control codeword is decoded successfully.

2. The terminal of claim 1 wherein the controller is configured to conclude that an in synchronization event has occurred if the control codeword is decoded successfully.

3. The terminal of claim 1 wherein the controller is configured to conclude that an in synchronization event has not occurred if at least one control codeword addressed to the terminal was decoded unsuccessfully.

4. The terminal of claim 1 wherein the controller is configured to:
receive a reference signal transmitted from a base station; and
determine the decoder error rate corresponding to the hypothetical control codeword based on the received reference signal and a payload parameter of the hypothetical control codeword.

5. The terminal of claim 1 wherein the controller is configured to determine a synchronization status from the decoder error rate.

6. The terminal of claim 1 wherein the controller is configured to set a recovery range based upon at least one payload parameter.

7. The terminal of claim 1 wherein the controller is configured to:
receive a reference signal transmitted from a base station; and
determine a synchronization status based on the received reference signal.

8. The terminal of claim 1 wherein the hypothetical control codeword is one of a downlink control information Format 1A and a downlink control information Format 1C.

9. The terminal of claim 1 wherein the controller is configured to determine that the decoder error rate is larger than a first threshold.

10. The terminal of claim 1 wherein:
the controller is configured to conclude that the out of synchronization event has occurred if at least one control codeword is decoded unsuccessfully.

11. The terminal of claim 1 wherein the evaluation period is comprised of the first evaluation period followed by the second evaluation period.

12. The terminal of claim 1 wherein the evaluation period is comprised of only the first evaluation period.

13. The terminal of claim 1 wherein the evaluation period is comprised of only the second evaluation period.

14. A wireless communication terminal comprising:
a transceiver configured to operate in a first discontinuous reception (DRX) mode or in a second DRX mode; and
a controller coupled to the transceiver, the controller configured to determine a synchronization based on determining a decoder error rate corresponding to a hypothetical control codeword over an evaluation period that includes at least one of a first evaluation period and a second evaluation period, wherein the transceiver uses the first evaluation period when the transceiver is configured to operate in the first DRX mode and the second evaluation period when the transceiver is configured to operate in the second DRX mode, wherein the first evaluation period is different than the second evaluation period, the controller configured to attempt to decode a control codeword in a received signal based on the hypothetical control codeword, the controller configured to conclude that an out of synchronization event has not occurred if the control codeword is decoded successfully.

15. The terminal of claim 14 wherein a periodicity of the first DRX mode is different than a periodicity of the second DRX mode.

16. The terminal of claim 14 wherein the evaluation period is comprised of only the second evaluation period.

* * * * *